(No Model.)
F. W. MEYER.
SLEIGH.
No. 394,382. Patented Dec. 11, 1888.
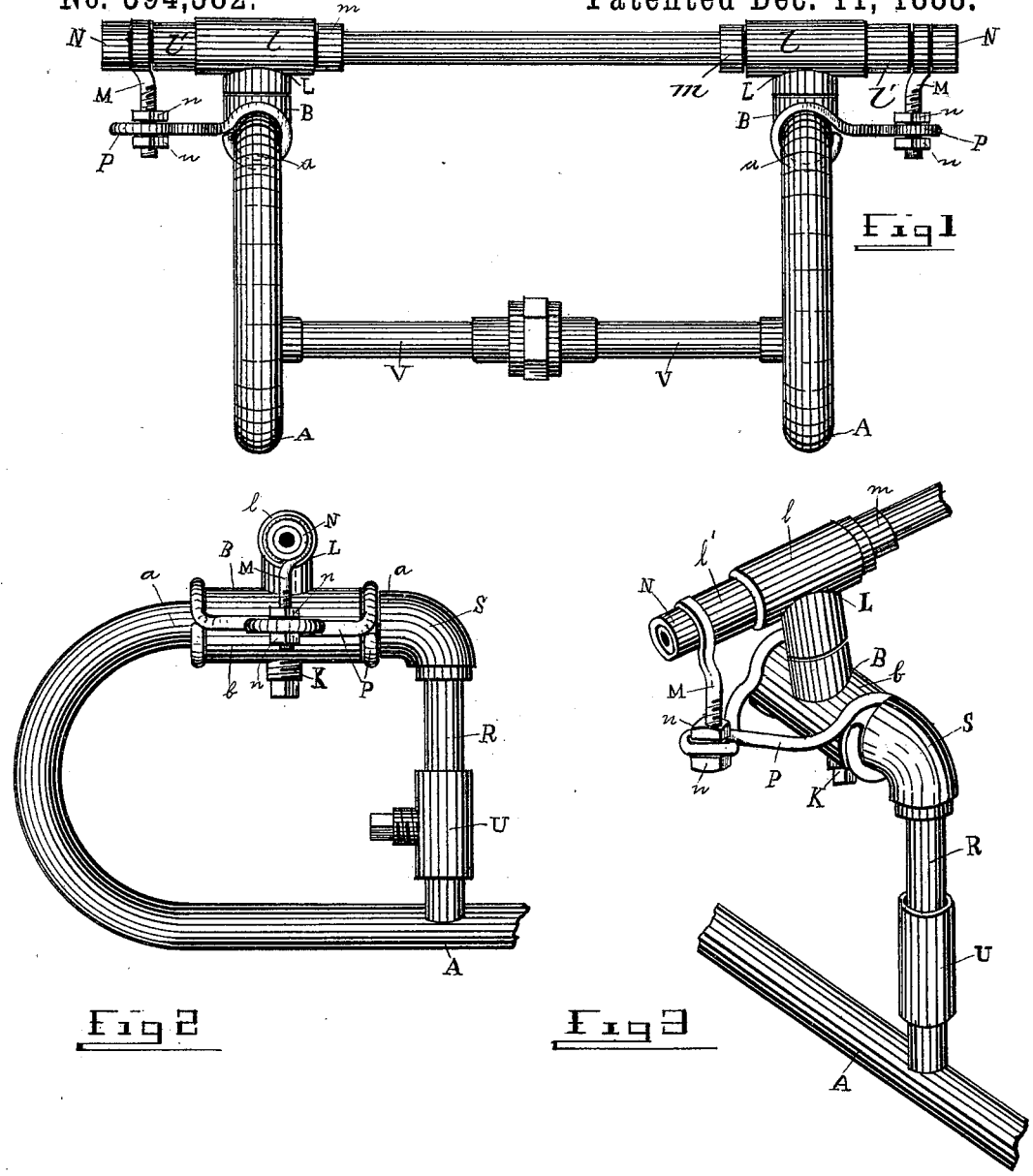
WITNESSES:
C. W. Seville
P. L. Brooks
INVENTOR:
F. William Meyer
by
T. A. Alexander
Attorney.

UNITED STATES PATENT OFFICE.

FRED WILLIAM MEYER, OF LOUISVILLE, KENTUCKY.

SLEIGH.

SPECIFICATION forming part of Letters Patent No. 394,382, dated December 11, 1888.

Application filed September 17, 1888. Serial No. 285,568. (No model.)

*To all whom it may concern:*

Be it known that I, FRED WILLIAM MEYER, of Louisville, in the county of Jefferson and State of Kentucky, have invented certain new and useful Improvements in Sleighs; and I do hereby declare that the following is a full, clear, and exact description thereof, reference being had to the accompanying drawings, and to the letters of reference marked thereon, which form part of this specification.

This invention relates to certain improvements upon the invention for which Letters Patent of the United States were granted to me the 7th day of August, 1888, No. 387,528, for improvements in sleighs in which runners were adjustably arranged so as to be conveniently applied to a wheeled vehicle when the wheels were removed.

The present invention is designed not only to provide for the lateral and vertical adjustment of the parts, but to provide longitudinally-adjustable attachments whereby the runners may be adjusted and applied to vehicles of different lengths, thus adapting the runners to any size of vehicle, as more fully hereinafter explained.

The above-mentioned objects I attain by the means illustrated in the accompanying drawings, in which—
Figure 1 represents an end view of a pair of runners constructed according to my invention, showing the said runners attached to the axles of a vehicle. Fig. 2 represents a side elevation showing a detailed view of a portion of the sleigh and one of the longitudinally-adjustable attachments forming part of my invention, and Fig. 3 represents a perspective view of the same.

Referring to the drawings, the letter A indicates the runners of the sleigh, which are constructed of metal pipes or tubes curved or bent upwardly at their rear and front portions, the front and rear ends being then bent horizontally toward each other, as indicated by the letter $a$, forming longitudinal bearings, upon which are arranged adjustable T-joints B, which may be moved longitudinally upon the horizontal portions $a$, before mentioned. The sleeves $b$ of said T-joints are provided with threaded apertures and binding-screws K, the inner ends of which bear against the horizontal portions $a$ of the runners and serve to hold the said T-joints in properly-adjusted positions. To the upwardly-projecting branches of the said T-joints are connected, by short studded tubular sections, the downwardly-projecting branches of similar T-joints, L, the sleeves $l$ of which are arranged at right angles to the sleeve $b$ of the T-joints B. The said sleeves $l$ at their outer ends are provided with short collars $l'$, as indicated.

In Fig. 1 of the drawings one of the axles of the vehicle is shown in position with the runner secured thereto. The axle is provided with collars or shoulders $m$, against which the inner ends of the sleeves $l$ bear, being held securely thereto by means of the eyebolts M, passing over the ends of the axle-skeins, and the threaded nuts N, screwed on the extremities of the skeins outside of the eyebolts. The said eyebolts are threaded at their lower ends, and are provided with screw-nuts $n$. The said threaded ends pass through loops in the brackets P, which are constructed in the present instance of metal rods bent around the upper horizontal portions $a$ of the runners at each end of the sleeves $b$, so as to move with the sleeve when it is adjusted. The threaded ends of the eyebolts are securely fastened in the loops of the bracket by means of the screw-nuts $n$ after the runners have been attached to the axle, relieving the strain on the nuts and forming guards to protect the axle-skeins and brace them, so as to sustain rough usage.

The runners are provided with upright standards R, which are connected at their upper ends with the ends of said runners by means of elbow-joints S, and the standards are provided with vertically-adjustable T-joints U, having adjustably-connected transverse brace rods or tubes V, similar to those described in my former patent above mentioned.

In applying my improved runners to a vehicle the wheels are removed from the same, the transverse braces are disconnected, and the sleeves $l$ of the T-joints L are placed over the axle-skeins, the sleeves $b$ of the T-joints B being adjusted longitudinally on the portions $a$ of the axle for the purpose, and confined in their adjusted positions by the set-screws. The eyebolts M are then passed on the skeins and the nuts N screwed up to the same, securely binding the sleeves $l$ against the collars on the axle. The brackets are then raised and the threaded ends of bolts M passed through their loops and secured therein by means of the screw-nuts n, firmly fastening the parts together.

Having thus described my invention, what I claim, and desire to secure by Letters Patent, is—

1. The combination, in a sleigh, of a pair of runners having their upper curved ends bent into a horizontal position, and adjustable T-joints B, arranged upon the same, and the T-joints L, secured upon joints B at right angles thereto, the said joints being provided with suitable bearings for the axle-skeins of a vehicle, whereby the runners may be adjusted longitudinally to vehicles of different sizes, substantially as specified.

2. The combination, in a sleigh, of a pair of runners, the adjustable T-joints B, arranged on the upper horizontal portions thereof, and the T-joints L, secured to said adjustable joints with their sleeves at right angles thereto, so as to serve as bearings to the axle-skeins of the vehicle, with the axles and the devices for securing the axles to joints L, substantially as specified.

3. The combination, with the adjustable T-joints and the T-joints at right angles thereto, having collars at their outer ends, through which the axle-skeins of the vehicle are adapted to pass, of the eyebolts suspended from the axle-skeins outside joints L, and nuts, and the brackets embracing the runners and adapted to connect securely with the ends of the eyebolts, substantially as and for the purpose specified.

In testimony that I claim the foregoing as my own I affix my signature in presence of two witnesses.

FRED WILLIAM MEYER.

Witnesses:
JOHN L. HEMING,
AUGUSTUS H. MARRET, Jr.